United States Patent
Zeeff

(10) Patent No.: US 7,322,826 B2
(45) Date of Patent: Jan. 29, 2008

(54) SOFT TISSUE MODEL

(75) Inventor: Mike Zeeff, Grand Haven, MI (US)

(73) Assignee: Medical Accessories and Research Corp., Zeeland, MI (US)

( * ) Notice: Subject to any disclaimer, the term of this patent is extended or adjusted under 35 U.S.C. 154(b) by 165 days.

(21) Appl. No.: 10/936,214

(22) Filed: Sep. 8, 2004

(65) Prior Publication Data

US 2006/0051729 A1    Mar. 9, 2006

(51) Int. Cl.
*G09B 23/28* (2006.01)

(52) U.S. Cl. ........................ 434/267; 434/272

(58) Field of Classification Search ................ 434/262, 434/267, 270, 271, 272, 274; 623/13.11, 623/13.12, 13.14, 13.15, 13.16, 16.17, 13.2
See application file for complete search history.

(56) References Cited

U.S. PATENT DOCUMENTS

| | | | | |
|---|---|---|---|---|
| 4,058,910 A | * | 11/1977 | Funk | 40/381 |
| 4,255,820 A | * | 3/1981 | Rothermel et al. | 623/13.11 |
| 4,466,800 A | * | 8/1984 | Breiden | 434/267 |
| 4,834,755 A | * | 5/1989 | Silvestrini et al. | 623/13.19 |
| 4,950,293 A | * | 8/1990 | Beacon et al. | 623/13.2 |
| 5,967,790 A | * | 10/1999 | Strover et al. | 434/274 |
| 6,096,076 A | * | 8/2000 | Silvestrini | 623/5.12 |
| 6,780,016 B1 | * | 8/2004 | Toly | 434/262 |
| 2002/0137014 A1 | * | 9/2002 | Anderson et al. | 434/262 |

* cited by examiner

*Primary Examiner*—Kurt Fernstrom
(74) *Attorney, Agent, or Firm*—Watson IP Group, PLC; Jovan N. Jovanovic; Vladan M. Vasiljevic

(57) ABSTRACT

A skeletal system comprising at least two bones and soft tissue. The soft tissue comprises a body and at least two protrusions. Each of the at least two protrusions have an end. At least one of the ends is attached to a first bone and at least one of the ends is attached to a second bone. The soft tissue further comprises a core having a first elasticity and a cladding having a second elasticity. The first elasticity is substantially less than the second elasticity, such that the core substantially limits the elongation of the cladding.

11 Claims, 1 Drawing Sheet

SOFT TISSUE MODEL

BACKGROUND OF THE INVENTION

1. Field of the Invention

The present invention relates in general to medical aids, and more particularly, to soft tissue for use in association with the modeling of the body of humans and other animals. Such soft tissue is often utilized in association with training and/or demonstration of surgical procedures and/or surgical products.

2. Background Art

Increasingly, anatomical reproductions and models are taking the place of cadavers for the training of medical professionals. The need to practice surgical techniques has become increasingly important in the rapidly changing medical field. Artificial models provide advantages relative to cost, storage, reliability and shelf life. Furthermore, anatomical reproductions are increasingly utilized for the display of medical products such as artificial hips, elbows, shoulders and knees. Such models allow a physician to examine the medical product and the interaction the medical device would have with a patient. While there are multiple advantages, there have been certain disadvantages associated with conventional models.

Among other disadvantageous, conventional soft tissue models lack realistic characteristics. With certain models, both hard tissue and soft tissue comprise identical materials. Thus, only the outward appearance in any manner simulates the anatomical component. In other models, soft tissue comprises a softer material (such as a foam). The material does not have characteristics that simulate the soft tissue that is being modeled. For example, certain materials are inelastic, whereas other materials are exceedingly elastic. In either case, the manipulation (i.e., scoring, cutting, moving, clamping, etc.) is by no means realistic.

Accordingly, it is an object of the invention to provide soft tissue which exhibits enhanced realism.

It is another object of the invention to provide a soft tissue which can more closely mimic the tissue that is being modeled.

These and other objects will become apparent in light of the specification and claims appended hereto.

SUMMARY OF THE INVENTION

One aspect of the invention comprises a soft tissue model comprising a core having a first elasticity and a cladding having a second elasticity. The first elasticity is substantially less than the second elasticity, such that the core substantially limits the elongation of the cladding.

In a preferred embodiment, the core comprises a nylon material, and the cladding comprises a polyurethane.

In another preferred embodiment, the core and cladding define a body having a plurality of protrusions, each protrusion terminates at an end. In one such embodiment, the ends are configured for attachment to a bone.

In another embodiment, the cladding further includes at least one of a dye and a colorant so as to exhibit a color substantially identical to that of the desired tissue to be modeled.

In another embodiment, the elongation thereof is substantially less than the elongation of the cladding alone.

In a preferred embodiment, the cladding has a Shore A "00" hardness of 20 to 40.

In another aspect of the invention, the invention comprises a skeletal system. A skeletal system comprising at least two bones and soft tissue. The soft tissue comprises a body and at least two protrusions. Each of the at least two protrusions have an end. At least one of the ends is attached to a first bone and at least one of the ends is attached to a second bone. The soft tissue further comprises a core having a first elasticity and a cladding having a second elasticity. The first elasticity is substantially less than the second elasticity, such that the core substantially limits the elongation of the cladding.

In a preferred embodiment, the core comprises a nylon material, and the cladding comprises a polyurethane.

In another preferred embodiment, the cladding further includes at least one of a dye and a colorant so as to exhibit a color substantially identical to that of the desired tissue to be modeled.

In yet another preferred embodiment, the elongation of the soft tissue is substantially less than the elongation of the cladding alone.

Preferably, the cladding has a Shore A "00" hardness of between 20 and 40.

BRIEF DESCRIPTION OF THE DRAWING

The invention will now be described with reference to the drawings wherein.

DETAILED DESCRIPTION OF THE INVENTION

Figure 1:
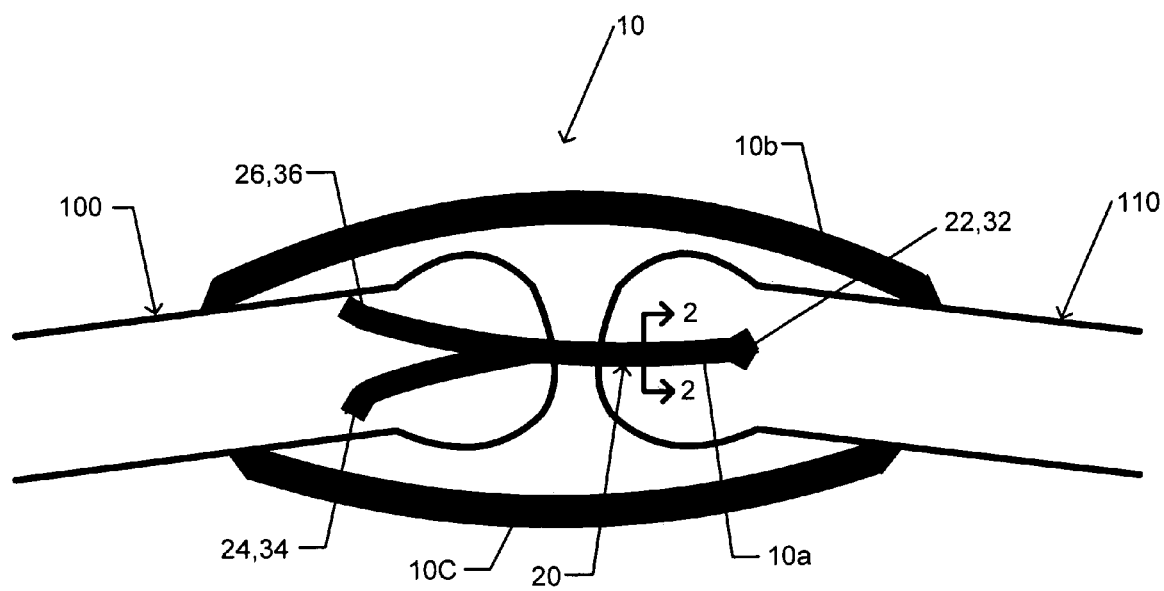
FIG. 1 of the drawings a perspective view of a skeletal system of the present invention, showing, in particular, the soft tissue of the present invention.

While this invention is susceptible of embodiment in many different forms, there is shown in the drawing and will herein be described in detail several specific embodiments with the understanding that the present disclosure is to be considered as an exemplification of the principles of the invention and is not intended to limit the invention to the embodiments illustrated.

It will be understood that like or analogous elements and/or components, referred to herein, may be identified throughout the drawings with like reference characters.

Referring now to the drawing and to FIG. 1 in particular, soft tissue is shown generally at 10. The soft tissue is generally coupled with or associatable with bones or other rigid tissue, such as bones 100, 110. The bones or other rigid tissue generally comprises a rigid polymer. One such construction is disclosed in co-pending application Ser. No. 10/616,705 entitled "Artificial Bone" the entire specification of which is hereby incorporated by reference. Of course, other materials are likewise contemplated for use, including, but not limited to, paperboard, wood, plaster, among others. The invention is not limited to any particular rigid tissue or bone material, or any particular configuration thereof.

Any particular device may include multiple rigid tissue and multiple soft tissue. For example, in the embodiment shown, rigid tissue (bones) 100 and 110 are coupled together by way of soft tissue 10a, 10b and 10c. Soft tissue 10a will be described with the understanding that the remaining soft tissue 10b and 10c are substantially similar in construction. The soft tissue is generally shaped to anatomically correspond to the soft tissue of a human or other animal. In certain cases, it may be desirable to scale such representations, or to deviate from anatomical correctness. In other embodiments, it may be desirable to introduce a defect or other problematic conditions.

Soft tissue 10a is shown in FIG. 1 as comprising body 20 and projections 22, 24 and 26. It will be understood that a soft tissue may have a greater or fewer number of projections. Each of the projections terminates at ends 32, 34 and 36, respectively. These ends can be coupled to bones 100 and 110, as desired. In certain embodiments, it may be desirable to adhere ends 32, 34 and 36 to bones 100 and/or 110. In other embodiments, these components may be heat sealed, welded, adhered, glued, chemically bonded, etc.

Figure 2:
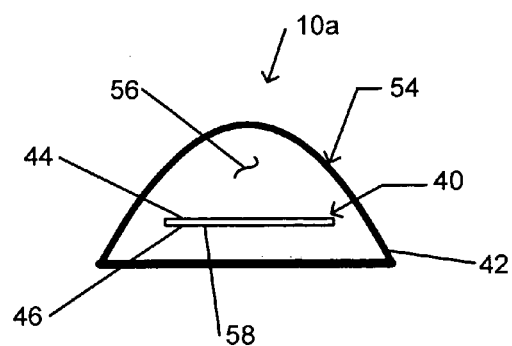
FIG. 2 of the drawings comprises a cross-sectional view of the soft tissue of FIG. 1 taken generally about lines 2-2 of FIG. 1.

Soft tissue 10a is shown in greater detail in FIG. 2 as comprising core 40 and cladding 42. Core 40 includes upper and lower surfaces 44, 46. Core 40 comprises a relatively inelastic material of substantially limited elongation and deformation. One such material comprises a nylon material having a tradename "tulle" manufactured by Home Sweet Home. Other materials, such as synthetic polymers as well as natural materials are likewise contemplated for use. The function of core 40 is to limit the elongation and elastic deformation of the soft tissue.

Cladding 42 is shown in FIG. 2 as comprising outer surface 54, body 56 and mating surface 58. Outer surface 54 is generally molded so as to anatomically resemble the soft tissue that is modeled. For example, the outer configuration may mimic bone or ligament features. Mating surface 58 interacts with upper and lower surfaces 44, 46 of core 40 so as to substantially adhere thereto. In certain embodiments, the upper and lower surfaces may be treated or otherwise prepared for the introduction of cladding 42, and the adhesion thereof. Cladding 42 comprises a material which is substantially more elastic than core 40. In one embodiment, cladding 42 comprises a polyurethane material sold under the tradename TC-410 (parts a-c) manufactured by BJB. Of course, the invention is not limited to this particular material, and other materials which are more elastic than core 40 are contemplated for use. Preferably, the cladding material can be dyed or otherwise colored to match the soft tissue being modeled. It is desired that the Shore A "00" hardness of the cladding is between 20 and 40, and most preferably about 25.

The combination of core and cladding materials are selected to mimic the soft tissue in both appearance, feel and performance. As such, the cladding material preferably appears similar to the soft tissue that is modeled. Additionally, the soft tissue is capable of being manipulated (i.e., handled, clamped, cut, scored, etc.) in a manner similar to the tissue being modeled. Furthermore, the soft tissue exhibits elongation consistent with the tissue being molded.

Certain tests were conducted utilizing the materials described above. In particular, two samples were prepared. The first sample comprised a soft tissue model of a muscle. The first sample was molded from the cladding material specified above. The second sample comprised a soft tissue model of the same muscle. However, the second sample was constructed with a core and a cladding, as disclosed above. Both samples were tested by fixing a first end and by attaching a weight to the second end to measure elongation. In this particular test, a 2.5 lb. weight was utilized. When the weight was suspended from the first sample, an elongation of 343% was observed. When the same weight was suspended from the second sample, an elongation of 22% was observed. Thus, the combination of the core and cladding limited elongation, while more closely mimicking the appearance and characteristics of the modeled tissue.

To manufacture the soft tissue of the present invention, a mold is first provided. Once provided, the mold cavity can be filled partially with the cladding in a liquid form. Next, the core can be positioned. Finally, the remainder of the cavity is filled with the cladding. The cladding material is allowed time to set. In certain embodiments, it may be necessary to allow both the cladding and the core to set. Certain materials may require the application of heating.

Once set, the soft tissue can be removed from the mold cavity. In certain embodiments, a dye or other colorant may be added to the cladding material prior to molding. Furthermore, certain trimming and other finishing may be applied after the soft tissue is removed from the mold.

Once complete, the soft tissue may be attached as desired to other components, such as bones 100, 110. As explained above, such attachment may be achieved through a number of different means. The completed soft tissue is capable of being handled in a manner similar to that of the soft tissue that is being modeled. Advantageously, the soft tissue of the present invention more closely mimics the appearance and characteristics of the soft tissue that is being modeled.

The foregoing description merely explains and illustrates the invention and the invention is not limited thereto except insofar as the appended claims are so limited, as those skilled in the art who have the disclosure before them will be able to make modifications without departing the scope of the invention.

What is claimed is:

1. A non-implantable soft tissue model comprising:
   a core having a first elasticity; and
   a cladding molded about the core, the cladding having a second elasticity, the first elasticity being substantially less than the second elasticity, such that the core substantially limits the elongation of the cladding molded therearound,
   wherein the core and cladding define a body having a plurality of protrusions, each protrusion terminating at an end.

2. The soft tissue model of claim 1 wherein the core comprises a nylon material, and the cladding comprises a molded polyurethane.

3. The soft tissue model of claim 1 wherein the ends are configured for attachment to an artificial bone.

4. The soft tissue model of claim 1 wherein the cladding further includes at least one of a dye and a colorant so as to exhibit a color substantially identical to that of the desired tissue to be modeled.

5. The soft tissue model of claim 1 wherein the elongation thereof is substantially less than the elongation of the cladding alone.

6. The soft tissue model of claim 1 wherein the cladding has a Shore A "00" hardness of between 20 and 40.

7. A skeletal system model comprising:
   at least two bones;
   a non-implantable soft tissue comprising:
      a body and at least two protrusions, each of the at least two protrusions having an end, at least one of the ends attached to a first bone and at least one of the ends attached to a second bone, the soft tissue further comprising:
      a core having a first elasticity; and
      a cladding molded about the core, the cladding having a second elasticity, the first elasticity being substantially less than the second elasticity, such that the core substantially limits the elongation of the cladding molded therearound.

8. The skeletal system of claim 7 wherein the core comprises a nylon material, and the cladding comprises a polyurethane molded therearound.

9. The skeletal system of claim 7 wherein the cladding further includes at least one of a dye and a colorant so as to exhibit a color substantially identical to that of the desired tissue to be modeled.

10. The skeletal system of claim 7 wherein the elongation of the soft tissue is substantially less than the elongation of the cladding alone.

11. The skeletal system of claim 7 wherein the cladding has a Shore A "00" hardness of 20 to 40.

* * * * *